United States Patent
Takeshita

(10) Patent No.: US 8,559,809 B2
(45) Date of Patent: Oct. 15, 2013

(54) IMAGE SHOOTING DEVICE

(75) Inventor: Tetsuya Takeshita, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/167,545

(22) Filed: Jun. 23, 2011

(65) Prior Publication Data

US 2011/0317992 A1    Dec. 29, 2011

(30) Foreign Application Priority Data

Jun. 28, 2010   (JP) ................................ 2010-146138

(51) Int. Cl.
  *G03B 7/00* (2006.01)
  *G03B 15/03* (2006.01)
(52) U.S. Cl.
  USPC .......................................... 396/157; 396/225
(58) Field of Classification Search
  USPC ................. 396/157, 225; 348/223.1, 370, 371
  See application file for complete search history.

(56) References Cited

U.S. PATENT DOCUMENTS

| | | | |
|---|---|---|---|
| 2004/0091254 A1 | 5/2004 | Shiraishi | |
| 2006/0256207 A1* | 11/2006 | Kokubo et al. | 348/223.1 |
| 2007/0273772 A1* | 11/2007 | Shirai | 348/223.1 |
| 2008/0068468 A1* | 3/2008 | Kitajima | 348/223.1 |

FOREIGN PATENT DOCUMENTS

| | | |
|---|---|---|
| JP | A-2004-77517 | 3/2004 |
| JP | A-2004-140528 | 5/2004 |
| JP | A-2009-284078 | 12/2009 |

OTHER PUBLICATIONS

May 8, 2012 Office Action issued in Japanese Patent Application No. 2010-146138 (with translation).

* cited by examiner

*Primary Examiner* — W B Perkey
(74) *Attorney, Agent, or Firm* — Oliff & Berridge, PLC

(57) ABSTRACT

An image shooting device includes an image shooting part, an operation part, a display part that displays a first image which is being shot by the image shooting part under a first light source on a display medium, a recording part that records a second image shot under a second light source by the image shooting part which receives the image shooting instruction from the operation part in a storage medium, a shooting condition setting part that sets a first shooting condition for the first image and a second shooting condition for the second image when the first light source is different from the second light source, and a shooting condition control part that performs control on shooting conditions of the image shooting part such that the first image is shot under the first shooting condition and the second image is shot under the second shooting condition.

14 Claims, 3 Drawing Sheets

IMAGE SHOOTING DEVICE

CROSS REFERENCE TO RELATED APPLICATION

This application is based upon and claims the benefit of priority from Japanese Patent Application No. 2010-146138, filed on Jun. 28, 2010, the entire contents of which is incorporated herein by reference.

BACKGROUND

1. Field

The present application relates to an image shooting device.

2. Description of the Related Art

In electronic cameras today, instead of using an optical viewfinder, moving images (referred to as live view images) sequentially shot are displayed on a monitor such that the state and the composition of a subject can be checked (for example, Japanese Unexamined Patent Application Publication No. 2004-77517.

However, in a conventional electronic camera, since a live view image and a still image (referred to as the present shooting image) are shot under the same exposure conditions and the same white balance gain, especially when the present shooting image is shot with a flash, there has been a problem of the live view image and the present shooting image differing in the finished quality (such as brightness and hues) from each other.

SUMMARY

An image shooting device according to the present embodiment includes an image shooting part that shoots a subject, an operation part that provides an image shooting instruction to the image shooting part, a display part that displays a first image which is being shot by the image shooting part under a first light source on a display medium, a recording part that records a second image shot under a second light source by the image shooting part which receives the image shooting instruction from the operation part in a storage medium, a shooting condition setting part that sets a first shooting condition for the first image and a second shooting condition for the second image when the first light source is different from the second light source, and a shooting condition control part that performs control on shooting conditions of the image shooting part such that the first image is shot under the first shooting condition set by the shooting condition setting part and the second image is shot under the second shooting condition set by the shooting condition setting part.

According to the present embodiment, it is possible to reduce an uncomfortable feeling of a user on images before and after an image shooting instruction.

DETAILED DESCRIPTION OF THE EMBODIMENTS

An embodiment of an image shooting device according to the present invention will be described in detail below with reference to accompanying drawings.

[Configuration of the Image Shooting Device 101]

Figure 1:
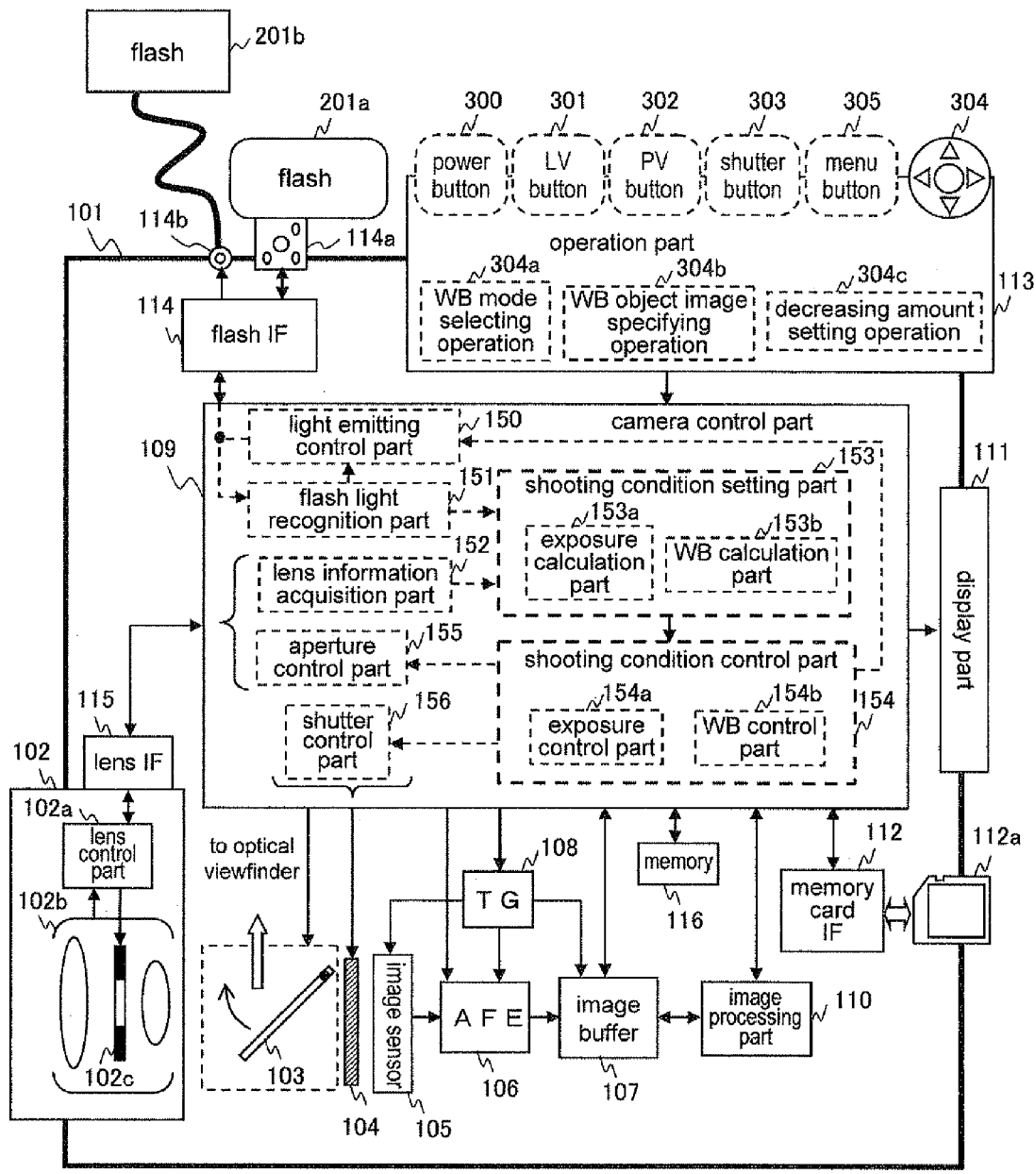
FIG. 1 is a block diagram showing the configuration of an image shooting device 101 according to an embodiment.

FIG. 1 is a block diagram showing the configuration of the image shooting device 101 according to the present embodiment. The image shooting device 101 includes: a lens 102; a spring-up mirror 103 that guides light from a subject toward a viewfinder; a mechanical shutter 104; an image shooting element 105; an AFE (analog front end) 106; an image buffer 107; a TG (timing generator) 108; a camera control part 109; an image processing part 110; a display part 111; a memory card IF 112 to which a memory card 112a is fitted; an operation part 113; a flash IF 114 that has a hot shoe 114a and an X-contact (synchro contact) 114b; a lens IF 115; and a memory 116.

Furthermore, the lens 102 includes: a lens control part 102a; a lens group 102b formed with a focus lens, a zoom lens or the like; and an aperture 102c. The lens control part 102a is connected to the camera control part 109 through the lens IF 115; the lens control part 102a outputs, to the camera control part 109, information on a distance from the position of the focus lens to the subject, and opens and closes the aperture 102c according to an instruction from the camera control part 109.

The image shooting device 101 according to the present embodiment is an electronic camera that can check the state and the composition of the subject through an optical viewfinder and that can also check the state of the subject by displaying, on the display part 111 as moving images (live view displaying), the images of the subject sequentially shot by the image shooting element 105. It should be noted that in the following description, an image that is shot by the pressing down of a shutter button 303 of the operation part 113 by a photographer is referred to as the present shooting image, and an image that is displayed on the display part 111 as a moving image in real time is referred to as a live view image.

In FIG. 1, when the photographer shoots while looking through the optical viewfinder of the image shooting device 101, the mirror 103 is placed in a position indicated by a solid line of FIG. 1, and light of the subject that enters through the lens 102 is reflected by the mirror 103 toward the optical viewfinder. Then, when the photographer presses down the shutter button 303 of the operation part 113, the camera control part 109 springs up the mirror 103 to a position indicated by a dotted line of FIG. 1, opens and closes the mechanical shutter 104 at a predetermined shutter speed and shoots the subject image with the image shooting element 105. It should be noted that the mirror 103 has a driving part within a box drawn by dotted lines and it is possible to spring up or down it according to an instruction from the camera control part 109.

On the other hand, when the photographer shoots while looking at the live view image displayed on the display part 111, the mirror 103 is lifted up to the position indicated by the dotted line of FIG. 1 and the mechanical shutter 104 is put into a state of being opened. Then, the camera control part 109 captures, through the AFE 106 into the image buffer 107, the live view image shot by the image shooting element 105 through electronic shutter control. This series of operations are repeated at a predetermined frame rate, and moving images are displayed on the display part 111 (live view images). The photographer looks at the live view images displayed on the display part 111 to check the state, the shooting composition or the like of the subject, and presses down the shutter button 303 of the operation part 113. When the shutter button 303 is pressed down, the camera control part 109 temporarily closes the mechanical shutter 104, then opens and closes it at the predetermined shutter speed, and shoots the subject image with the image shooting element 105.

In the image shooting element 105, photo diodes of RGB colors are two-dimensionally arranged on a light receiving surface; the image shooting element 105 outputs, to the AFE 106, electrical signals corresponding to the amount of light that has entered the photo diodes.

The AFE 106 adjusts the levels of the electrical signals of RGB colors output from the image shooting element 105 according to a gain indicated by the camera control part 109. Then, the analogue electrical signals whose levels have been adjusted are A/D converted into digital data and are captured into the image buffer 107.

The image buffer 107 is formed with a volatile high-speed memory or the like. The image buffer 107 is also used as a processing buffer employed when the image processing part 110 or the camera control part 109 performs image processing, white balance processing or the like; image data that has been subjected to the processing is also held in the image buffer 107.

The TG 108 outputs a timing signal to each part according to an instruction (for example, the resolution of an image read from the image shooting element 105) from the camera control part 109. For example, the TG 108 outputs a timing signal for reading an image signal from the image shooting element 105, a timing signal for performing the A/D conversion in the AFE 106, and a timing signal for writing image data into the image buffer 107.

The camera control part 109 is formed with a CPU that operates according to a program code previously stored inside or in the memory 116, and controls the overall operation of the image shooting device 101 according to the operation of various operation buttons provided in the operation part 113. For example, as shown in FIG. 1, the camera control part 109 related to the present embodiment includes at least a light emitting control part 150, a flash light recognition part 151, a lens information acquisition part 152, a shooting condition setting part 153, a shooting condition control part 154, an aperture control part 155 and a shutter control part 156. Furthermore, the shooting condition setting part 153 is formed with: an exposure calculation part 153a that calculates and sets exposure conditions; and a white balance (WB) calculation part 153b that calculates and sets a white balance gain. Likewise, the shooting condition control part 154 is formed with: an exposure control part 154a which controls an aperture value, the shutter speed or the like such that they fall within the exposure conditions set at the time of shooting; and a white balance (WB) control part 154b that multiplies a shooting image by the set white balance gain.

For example, the exposure calculation part 153a performs settings such as the setting of the aperture value and the setting of the shutter speed from a temporary shooting image and a live view image, captured by the image buffer 107. Then, the exposure control part 154a controls the aperture value calculated by providing an instruction to the aperture control part 155, further controls the shutter speed calculated by providing an instruction to the shutter control part 156 and thus shoots the live view image and the present shooting image. Likewise, the WB calculation part 153b sets the white balance gain according to a white balance mode which will be described later, and the WB control part 154b multiplies the live view image and the present shooting image captured in the image buffer 107 by the set white balance gain, and thus performs white balance adjustment.

When a flash 201a is connected to the hot shoe 114a, the flash light recognition part 151 acquires information on the model number, the guide number or the like of the flash 201a, and the lens information acquisition part 152 acquires information on a distance from the lens 102 to the subject. Alternatively, when it is not known whether or not the flash is connected, the flash light recognition part 151 instructs the light emitting control part 150 to emit light, and the light emitting control part 150 experimentally outputs, through the flash IF 114, a light emission trigger to the hot shoe 114a and the X-contact 114b. Then, from the brightness change of the temporary shooting image shot at this time, a histogram or the like, the flash light recognition part 151 determines whether or not a flash is actually emitted, and recognizes whether or not the flash is connected.

In this way, the camera control part 109 controls the overall operation of the image shooting device 101.

The image processing part 110 performs predetermined image processing indicated by the camera control part 109 on the live view image and the present shooting image captured in the image buffer 107. For example, the image processing part 110 performs color interpolation processing, edge enhancement processing or image compression processing. Although, in the present embodiment, the white balance processing is performed by the camera control part 109, it may be performed by the image processing part 110. Alternatively, the white balance calculation processing may be performed by the camera control part 109, and the white balance gain multiplication processing on the shot image data may be performed by the image processing part 110. Or, the image processing part 110 and the camera control part 109 may be put together as one processing block.

The display part 111 is formed with, for example, a liquid crystal monitor. A menu screen, the live view image or the present shooting image output by the camera control part 109 is displayed on the display part 111.

The memory card IF 112 provides an interface for recording the present shooting image output by the camera control part 109 in the memory card 112a, which is a removable storage medium. Alternatively, when the operation part 113 selects a reproduction mode for the shot image, the memory card IF 112 reads image data stored in the memory card 112a, and outputs it to the camera control part 109, and the camera control part 109 displays the read image on the display part 111.

The operation part 113 is formed with operation buttons such as a power supply button 300, a live view (LV) button 301, a preview (PV) button 302, the shutter button 303, a cross cursor button 304 and a menu button 305. The photographer uses these operation buttons to operate the image shooting device 101, and information resulting from the operations of these operation buttons is output to the camera control part 109. Then, the camera control part 109 controls the overall operation of the image shooting device 101 according to the information on the operations input from the operation part 113.

Here, although only buttons necessary for the present embodiment are shown in FIG. 1, operations necessary for a common camera such as the setting of the shutter speed, the aperture value or the like, the setting of sensitivity or shooting mode dialing are performed by using the operation buttons of the operation part 113. It should be noted that the cross cursor button 304 is formed with four cursor buttons arranged at upper, lower, left and right sides thereof and an OK button in the middle.

Figure 2A:
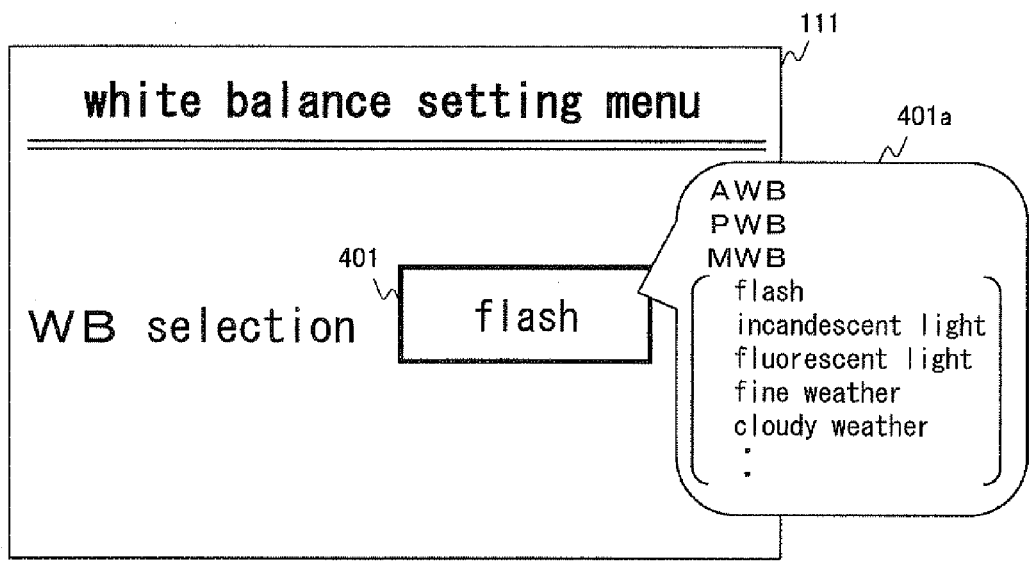
FIG. 2A is a diagram illustrating an example of the screen of a white balance setting menu.
Figure 2B:
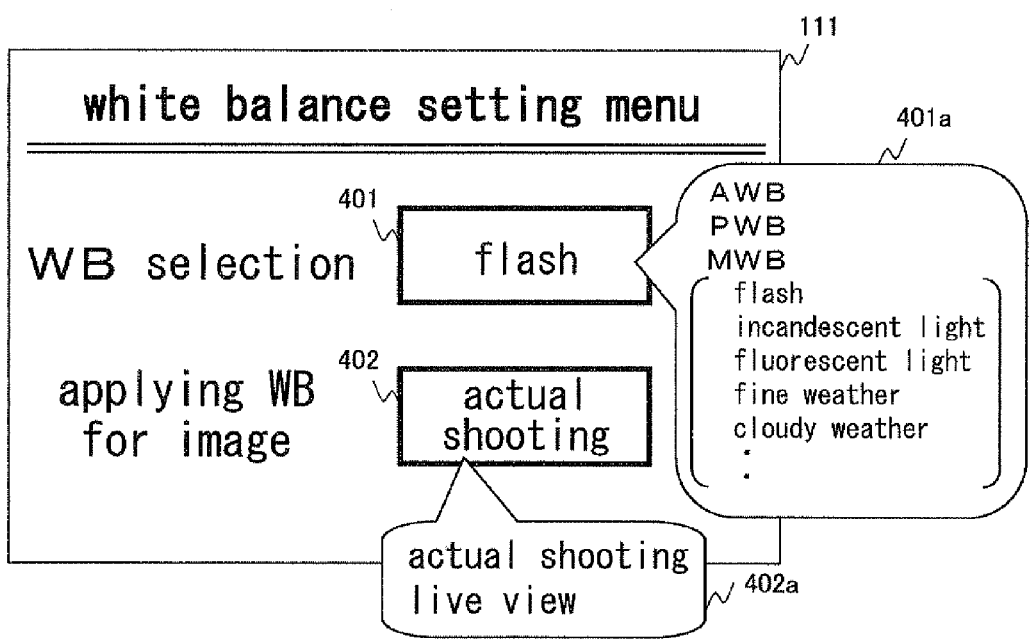
FIG. 2B is a diagram illustrating an example of the screen of the white balance setting menu.

For example, when the photographer presses down the menu button 305, a plurality of menu items (such as a white balance setting menu and a shooting image resolution setting menu) is displayed on the display part 111, and the photographer selects a menu item by performing the setting with the cross cursor button of the cross cursor button 304. Then, for example, when the white balance setting menu is selected as the menu item, as shown in FIG. 2A or 2B, the white balance setting menu is displayed on the display part 111. Meanwhile, the white balance setting menu will be described in detail later. Furthermore, although, in the present embodiment, various types of setting menus are displayed on the display part 111, a small-sized liquid crystal display part specifically designed for performing various settings may be provided.

The flash IF 114 provides an interface between the hot shoe 114a and the X-contact 114b and the camera control part 109. For example, the camera control part 109 reads information on the flash 201a connected to the hot shoe 114a through the flash IF 114, and controls the amount of light emitted from the flash 201a. Alternatively, the camera control part 109 simply turns on and off the X-contact on the hot shoe 114a and the X-contact 114b.

The flash 201a or the like can be fitted to the hot shoe 114a, and a flash 201b or the like can be connected to the X-contact 114b through a cable. The hot shoe 201a has a communication contact and the X-contact, and in the case of a flash that can communicate through the communication contact, the information such as the model number, the guide number or the like can be read from the side of the image shooting device 101. Alternatively, it is possible to control, for example, the amount of light emitted from the flash 201a from the side of the image shooting device 101. However, when the flash 201a does not have the communication function and is only connected to the X-contact on the hot shoe 201a, as with the flash 201b connected to the X-contact 201b, only control can be performed such that the light emission is turned on and off. Meanwhile, it is assumed that the camera control part 109 cannot check, with a circuit before the light emission, whether or not the flash 201a that does not have the communication function and the flash 201b are fitted.

The lens IF 115 is an interface between the lens control part 102a of a replaceable lens 102 and the camera control part 109 of the image shooting device 101. For example, the lens IF 115 is formed with: a power supply terminal to the lens 102; and a communication terminal through which the camera control part 109 reads information on the model number of the lens 102, the position of a focus lens (information on a distance to the subject) or the like and through which a control signal for indicating the aperture value to the lens 102 by the camera control part 109 is input/output.

The memory 116 is formed with a non-volatile flash memory or the like. The memory 116 stores a program code for the camera control part 109, parameters necessary for controlling the individual parts or the like. It should be noted that these parameters are changed as appropriate through the setting menu displayed on the display part 111.

What has been described is the basic configuration of the image shooting device 101. Next, the white balance mode used in the image shooting device 101 of the present embodiment will be described.

[White Balance Mode of the Image Shooting Device 101]

The image shooting device 101 of the present embodiment has three white balance modes, namely, a manual white balance (MWB), a preset white balance (PWB) and an auto white balance (AWB), and the photographer can make a selection. For example, the photographer presses down the menu button 305 of the operation button 113, and displays a white balance setting menu on the display part 111.

Here, an example of the white balance setting menu will be described with reference to FIG. 2. FIG. 2A shows an example of a selection (selection of the WB) menu of the white balance mode. Meanwhile, in FIG. 2A, the white balance mode that is set is applied to the present shooting image. Furthermore, FIG. 2B shows an example of a white balance setting menu that is configured so as to allow not only the selection (selection of the WB) of the white balance mode, but also the setting of an image (a WB application image: the present shooting image or the live view image) to which the selected white balance mode is applied.

In FIGS. 2A and 2B, the white balance mode is selected from three types of modes, namely, the auto white balance mode (AWB (AWB1 and AWB2)), the manual white balance mode (MWB) and the preset white balance mode (PWB). Furthermore, in the case of NWB, the type of light source (such as a flash, an incandescent light bulb, a fluorescent lamp, a fine weather or a cloudy weather) previously prepared is selected. Meanwhile, the AWB1 and AWB2 will be described in detail later.

For example, in the white balance setting menu of FIG. 2A or FIG. 2B, the photographer uses the cross cursor button 304 of the operation part 113 to perform a WB selection operation 304a, and thus the white balance mode (AWB, PWB and MWB (the type of light source)) selected from items within a pop-up window 401a is displayed on a selection window 401. When, in this state, the photographer presses down the OK button of the cross cursor button 304, the white balance mode displayed on the selection window 401 is set. In the example of FIG. 2A or FIG. 28, the NWB (flash) is set, and "NWB (flash)" is displayed on the selection window 401. In this way, the photographer sets the white balance mode.

Furthermore, in the white balance setting menu of FIG. 28, the photographer uses the cross cursor button 304 of the operation part 113 to perform a WB target image specification operation 304b, and thus the application image (the present shooting image or the live view image) of the white balance mode selected from items within a pop-up window 402a is displayed on a selection window 402. When, in this state, the photographer presses down the OK button of the cross cursor button 304, the white balance mode set on the selection window 401 is applied to the image displayed on the selection window 402. In the example of FIG. 28, the present shooting image is selected, and "the present shooting" is displayed on the selection window 402.

As described above, in the image shooting device 101 of the present embodiment, as shown in FIG. 2A, only the selection of the white balance mode may be performed or the application image of the white balance mode selected as shown in FIG. 28 can also be set.

Meanwhile, the case of FIG. 2A corresponds to the case where "the present shooting" is selected in FIG. 28, and the selected white balance mode is fixedly applied to only the present shooting image.

Here, each of the white balance modes will be described briefly.

(Manual White Balance Mode (MWB))

In the MWB, the user directly inputs light source information (such as color temperature information) and selects the type of light source (such as an incandescent light bulb, a fluorescent lamp, a fine weather or a cloudy weather), and uses the white balance gain previously held for each of the light sources according to the selected light source. It should be noted that the light source information and the white balance gain corresponding to the light source are previously stored in the memory 116.

(Preset White Balance Mode (PWB))

In the PWB, the user temporally shoots an achromatic subject such as a grey plate before shooting, a white balance gain is determined from image data temporally shot, the determined white balance gain is held in the memory 116 and shot image data is multiplied by the white balance gain. In this way, the adjustment of the white balance is performed. Meanwhile, since, in the preset white balance, the user temporally shoots an achromatic subject under an actual light source before shooting, and thus determines the white balance gain, it is possible to perform accurate white balance adjustment.

(Auto White Balance Mode (AWB))

In the AWB, the user does not particularly perform any operation on the white balance adjustment, the type of light source is automatically estimated from the image data captured in the image buffer 107 at the time of shooting, a white balance gain corresponding to the estimated light source is determined, and the image data is multiplied by the white balance gain. In this way, the white balance adjustment is performed.

It should be noted that in the present embodiment, when the AWB is used for the live view image, two auto white balances can be selected. This is because, when, in the AWB of a conventional electronic camera, a light source such as an incandescent light bulb is estimated, white balance adjustment is performed such that a reddish image is intentionally obtained. The reason for this is that the proper adjustment of the white balance degrades the taste of the incandescent light bulb. Therefore, when the present shooting image is shot with a flash while the live view image is being shot in the AWB under a light source that is an incandescent light bulb such as a modeling light, the live view image greatly differs in hue from the present shooting image. Consequently, there arises a problem of the photographer being unable to check the finished quality of the present shooting image from the live view image. Accordingly, in order to overcome this problem, the image shooting device 101 according to the present embodiment is provided with: a first white balance mode (AWB1) in which, when shooting is performed under a light source such as an incandescent light, a reddish image is intentionally obtained; and a second white balance mode (AWB2) in which, even when shooting is performed under a light source such as an incandescent light, proper white balance adjustment is performed. Furthermore, in accordance with the result of recognition by the flash light recognition part 151, the camera control part 109 automatically sets the AWB at the time of shooting of the live view image to the AWB1 or the AWB2. It should be noted that in the present embodiment, in particular, except when it is necessary to distinguish between the AWB1 and the AWB2, they are referred to as the AWB that indicates a general white balance mode.

Here, processing (white balance computation) for determining the white balance mode gain in the AWB or the PWB will be described. The shooting condition setting part 153 (WB calculation part 153*b*) of the camera control part 109 extracts an achromatic part of an image (such as the temporal shooting image or the live view image) captured in the image buffer 107, and determines the white balance gain from image data on the achromatic part. For example, the achromatic part of the image is first estimated, and the average values Ra, Ga and Ba of the image data on RGB colors in this part are individually determined. Then, with respect to G (green), the white balance gains (gain R and gain B) for the individual colors of R (red) and B (blue) are calculated according to (equation 1) and (equation 2).

$$\text{Gain } R = Ga/Ra \qquad \text{(equation 1)}$$

$$\text{Gain } B = Ga/Ba \qquad \text{(equation 2)}$$

Meanwhile, for the MWB, the white balance gain corresponding to the light source selected in the white balance mode setting menu described in FIG. 2 is set. In this case, a table in which light source and white balance gains are associated with each other is stored in the memory 116, and the WB calculation part 153*b* of the shooting condition setting part 153 references the table in the memory 116 and sets the white balance gain.

[Setting of Flash Shooting and the White Balance Mode]

Here, the setting of flash shooting and the white balance mode will be described. For example, when the flash light recognition part 151 recognizes the use of a flash at the time of the present shooting, the WB calculation part 153*b* of the shooting condition setting part 153 sets, to the AWB2, the white balance mode at the time of the live view shooting regardless of the setting of the white balance mode of the present shooting image. Therefore, even when the live view image is shot with a modeling light, since proper white balance adjustment in which a reddish image is avoided is performed, the photographer can check, on the display part 111, the live view image having a hue similar to the present shooting image shot with a flash.

On the other hand, when the flash light recognition part 151 recognizes that a flash is not used at the time of the present shooting, the WB calculation part 153*b* of the shooting condition setting part 153 sets the white balance setting at the time of the live view shooting to the same white balance setting as the white balance setting at the time of the present shooting. For example, when the white balance setting at the time of the present shooting is the AWB1, the white balance setting at the time of the live view shooting is also set to the AWB1. When, in the white balance setting at the time of the present shooting, the NWB (incandescent light bulb) or the PWB (in which an achromatic image is shot under an incandescent light bulb and the white balance gain is preset) is selected, the white balance setting at the time of the live view shooting is set to the AWB2, and the taste of the incandescent light bulb is left. Alternatively, the white balance setting at the time of the live view shooting is set to the NMB (incandescent light bulb), which is the same as the white balance setting at the time of the present shooting, or the PWB.

In this way, the photographer can check, on the display part 111, the live view image having a hue similar to the present shooting image.

[Setting of an Exposure Condition]

Next, the setting of an exposure condition will be described. The exposure condition is set by the exposure calculation part 153*a* of the shooting condition setting part 153, and, when the present shooting image and the live view image are shot under the same light source, the exposure condition is set to the same exposure condition. Furthermore, when the present shooting image and the live view image are shot under a different light source (for example, the present shooting image is shot with a flash), the exposure condition for the live view image is set by AE (automatic exposure). When the flash light recognition part 151 can acquire flash information, the exposure condition for the present shooting image at that time is set to an appropriate exposure condition according to the amount of light of the flash and the distance information on the lens 102 whereas, when the flash light recognition part 151 cannot acquire the flash information, a flash is experimentally emitted and thus temporal shooting is performed, and an appropriate exposure condition is calculated from the temporal shooting image.

In this way, it is possible to shoot the live view image and the present shooting image with appropriate exposure.

[Exposure Control at the Time of Temporal Shooting]

Next, exposure control at the time of temporal shooting will be described. When a flash is experimentally emitted and an temporal shooting image is shot, the flash light recognition part 151 decreases the size of the aperture 102c as compared with the live view shooting, and the shutter control part 156 increases the speed of the electronic shutter of the image shooting element 105, and thus the temporal shooting is performed under a shooting condition in which the sensitivity is lower than that obtained when the live view image is shot.

For example, the flash light recognition part 151 instructs the aperture control part 155 to decrease the aperture value. When the aperture control part 155 has received this instruction, the aperture control part 155 performs control through the lens IF 115 such that the lens control part 102a of the lens 102 decreases the aperture value of the aperture 102c.

The reason why, as described above, the shooting condition of the temporal shooting image is set to the shooting condition in which the sensitivity is lower than the shooting condition used when the live view image is shot is that, since the amount of light emitted from the flash is generally larger than the amount of light emitted from a light source such as a modeling lamp with which the live view image is shot, if the temporal shooting image is shot with a flash under the same shooting condition as when the live view image is shot, the temporal shooting image is overexposed and therefore saturated. When the temporal shooting image is overexposed, a histogram is unlikely to be acquired, and it is difficult not only to determine whether or not the flash is present but also to accurately determine the exposure condition and the white balance gain. Therefore, in the image shooting device 101 of the present embodiment, when the temporal shooting image is experimentally shot with the flash, the shooting condition is set to the shooting condition in which the sensitivity is lower than the shooting condition used when the live view image is shot.

It should be noted that the amount of decrease in the aperture value, the shutter speed or the like at the time of the temporal shooting may be previously set to a fixed value. Alternatively, the user may freely set the amount of decrease with the individual operation buttons of the operation part 113 through a decrease amount setting operation 304c. In this case, the user makes settings such as the decrease in the aperture value by three stages by performing the decrease amount setting operation 304c and the increase in the shutter speed by two stages. For example, when the aperture of the live view image is 5.6, the aperture of the present shooting image is set to 11, and the shutter speed of the live view image is set from $\frac{1}{125}$ to $\frac{1}{1000}$.

Since, as described above, the image shooting device 101 of the present embodiment performs shooting such that the temporal shooting image is prevented from being overexposed, it is possible not only to reliably determine whether or not the flash is present, but also to accurately determine the exposure condition and the white balance gain from the temporal shooting image.

[Method of Recognizing Whether or not the Flash is Connected]

Next, a method of recognizing whether or not the flash is connected to the image shooting device 101 will be described.

(1) In a case where information on the flash can be acquired (in a case where communication with the flash can be performed)

When the flash 114a attached to the hot shoe 114a can communicate with the camera control part 109 through the communication terminal of the hot shoe 114a and the flash IF 113, the flash light recognition part 151 of the camera control part 109 can read, from the flash 114a, information such as the model number, the guide number or the like of the flash 114a. Thus, the exposure calculation part 153a of the shooting condition setting part 153 can find the amount of light of the flash 114a.

In this case, the WB calculation part 153b of the shooting condition setting part 153 sets the white balance gain corresponding to the model number of the flash 114a. It should be noted that in the memory 116, the white balance gain corresponding to each model number of the flash is assumed to be stored.

Furthermore, the exposure calculation part 153a of the shooting condition setting part 153 uses both the amount of light emitted from the flash 114a obtained from the guide number and the information (measurement distance information) on the distance to the subject acquired from the lens 102 by the lens information acquisition part 152, and thus calculates the optimum exposure condition. Here, since the measurement distance information can be obtained from the focus position of the focus lens of the replacement lens 102, the lens information acquisition part 152 of the camera control part 109 reads the measurement distance information through the lens control part 201 and the lens IF 115. It should be noted that focus on the subject is assumed to be obtained by an AF operation or a manual focus operation.

In this way, when the information on the flash can be acquired (when communication with the flash can be performed), it is possible to set the optimum shooting condition of the present shooting image based on such information.

(2) In a case where information on the flash cannot be acquired (in a case where communication with the flash cannot be performed)

On the other hand, since the flash 114b connected through a cable to the X-contact 114b is a flash that simply turns on and off, the side of the camera control part 109 cannot detect the flash 201b being connected to the X-contact 114b. Alternatively, even when the flash is the flash 114a that is attached to the hot shoe 114a, the type of flash that does not utilize the communication terminal of the hot shoe 114a and that is connected to only the X-contact of the hot shoe 114a is available. Even in this case, the side of the camera control part 109 cannot detect the flash 114a connected to the hot shoe 114a.

Therefore, in the image shooting device 101 of the present embodiment, the flash light recognition part 151 instructs the light emitting control part 150 to emit the flash, and the light emitting control part 150 experimentally turns on the X-contact 114b of the flash IF 114 and the X-contact on the hot shoe 114a. Thus, when any flash is connected to the hot shoe 114a or the X-contact 114b, light is emitted. Then, at this time, a determination is made from the change in the brightness of the temporal image captured in the image buffer 107 and the histogram. For example, if a difference between the brightness of the image before the temporal light emission and the brightness of the image after the temporal light emission is equal to or more than a threshold value that is previously set, the flash is determined to be present whereas, if a difference between the brightness of the image before the temporal light emission and the brightness of the image after the temporal light emission is less than the threshold value that is previously set, the flash is determined not to be present. Alternatively, whether or not the flash is connected is determined by whether the histogram has characteristics unique to a flash.

Meanwhile, the temporal light emission may be performed when the photographer presses down the PV button 302 or such as when the photographer presses the shutter button halfway or presses down an AF button. Alternatively, the temporal light emission may be automatically performed when the camera control part 109 cannot recognize the connection of the flash at the time of the start of the live view mode. Here, as described previously, the temporal shooting image to be shot with the temporal light emission is shot by the decrease in the aperture value by a predetermined amount and by the increase in the shutter speed such that overexposure is prevented.

In this way, the flash light recognition part 151 recognizes whether or not the flash is connected. In particular, in the image shooting device 101 of the present embodiment, since, when it is not clear whether the flash is connected, whether the flash is connected is determined from the temporal shooting image shot with the temporal light emission, even when a flash incapable of performing communication is connected, it is possible to reliably recognize whether or not the flash is connected. In this case, the shooting condition setting part 153 calculates and sets the optimum shooting condition of the present shooting image from the temporal shooting image.

[Shooting Processing Performed by the Image Shooting Device 101]

Figure 3:
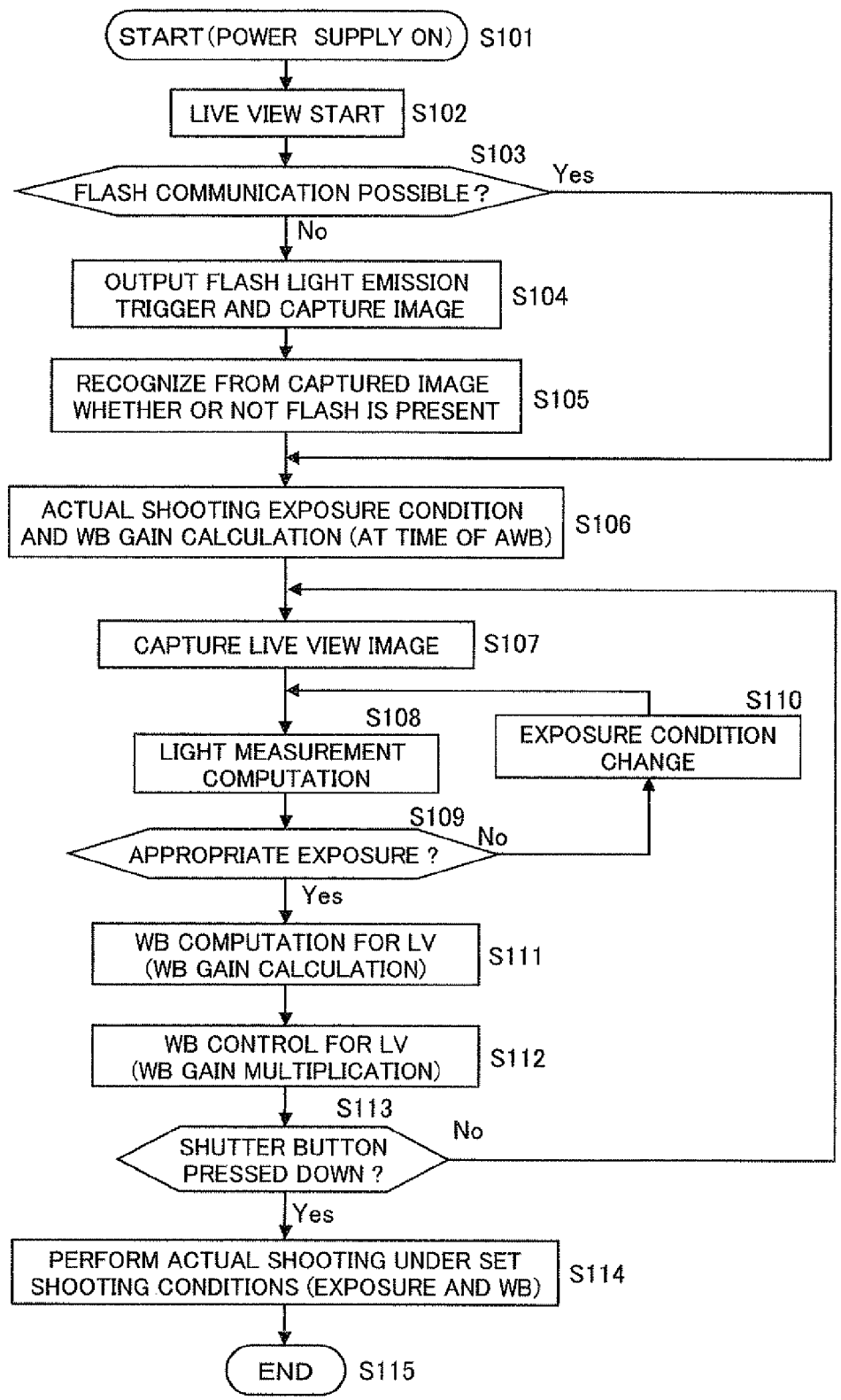
FIG. 3 is a flowchart showing processing conducted when the image shooting device 101 according to the embodiment performs shooting.

Next, shooting processing performed by the image shooting device 101 will be described in detail with reference to the flowchart of FIG. 3. It should be noted that the flowchart of FIG. 3 shows the flow of processing conducted when shooting is performed with the live view image displayed on the display part 111, and the processing is performed by the camera control part 109 according to the program previously stored inside or in the memory 116.

(Step S101) When the photographer presses down the power supply button 300 of the operation part 113, the power of the image shooting device 101 is turned on, and the camera control part 109 reads the parameter previously stored in the memory 116 and performs initial settings of the individual parts of the image shooting device 101, with the result that the image shooting device 101 is ready for the use of the photographer.

(Step S102) When the photographer presses down the LV (live view) button 301 of the operation part 113, the camera control part 109 starts the operation of shooting the live view image.

(Step S103) The flash light recognition part 151 of the camera control part 109 recognizes whether or not the communication with the flash 114a of the hot shoe 114a can be performed through the flash IF 113. If the communication can be performed, the process moves to step S106 whereas, if the communication cannot be performed, the process moves to step S104. Here, whether or not the communication can be performed is determined by, for example, experimentally outputting a predetermined read signal through the communication terminal of the hot shoe 114a and checking whether a response is received.

(Step S104) The flash light recognition part 151 experimentally outputs, through the flash control part 150 and the flash IF 113, a flash light emission trigger (a trigger for turning on the X-contact 114b and the X-contact on the hot shoe 114a), and captures an image (temporal shooting image) shot at that time in the image buffer 107. Meanwhile, when the temporal shooting image is shot, as described previously, the aperture value, the shutter speed or the like are set to shooting conditions on the low sensitivity side in accordance with the amount of decrease previously set by the photographer, and thus overexposure encountered when the flash is emitted is prevented.

(Step S105) The flash light recognition part 151 of the camera control part 109 recognizes, from the temporal shooting image captured in the image buffer 107, whether or not the flash is present. Meanwhile, the method of determining whether or not the flash is present is the same as described previously.

(Step S106) The shooting condition setting part 153 of the camera control part 109 determines, from the temporal shooting image captured in the image buffer 107 in step S105, the exposure condition at the time of the present shooting (the exposure calculation part 153a). Moreover, if the white balance setting at the time of the present shooting is the AWB, the white balance gain at the time of the present shooting is also calculated (the WB calculation part 153b).

For example, the exposure calculation part 153a, through a general light measurement computation, determines the brightness (By (brightness value) value) of the temporal shooting image and determines how much the By value deviates from the proper By value. Then, the sensitivity, the aperture value and the shutter speed are set such that the deviation of the By value is eliminated. Meanwhile, these values are set according to the shooting mode (such as aperture precedence or shutter speed precedence). For example, in the shooting mode of the aperture precedence, the shutter speed is set to reach the proper By value; in the shooting mode of the shutter speed precedence, the aperture value is set to reach the proper By value.

It should be noted that when the WB calculation part 153b performs the processing for calculating the white balance gain in the AWB setting, as described previously, the white balance gain is determined such that an achromatic part of the temporal shooting image becomes achromatic. Here, the AWB corresponds to the AWB2 in which the intentional correction described previously is not performed.

(Step S107) The camera control part 109 captures the live view image in the image buffer 107.

(Step S108) The shooting condition setting part 153 (the exposure calculation part 153a) of the camera control part 109 performs the light measurement computation on the live view image captured in the image buffer 107. The light measurement computation is the same as described in step S106, and is performed here on the live view image captured in the image buffer 107.

(Step S109) The shooting condition setting part 153 (the exposure calculation part 153a) of the camera control part 109 determines, from the result of the light measurement computation in step S108, whether or not the live view image captured in the image buffer 107 is shot with the proper exposure. Here, the determination on the proper exposure is performed by checking whether the deviation of the By value described previously falls within preset threshold values; if the deviation of the By value falls within the threshold values, the exposure is determined to be the proper exposure. If the exposure is the proper exposure, the process moves to step S111 whereas, if the exposure is proper, the process moves to step S110.

(Step S110) The shooting condition setting part 153 (the exposure calculation part 153a) of the camera control part 109 changes the exposure condition, and the process returns to step S107. When the exposure condition is changed, for example, at least one of the aperture value and the electronic shutter speed is changed.

Here, although shooting is performed under the default exposure condition at the time of the start of the live view image, since the exposure is not necessarily proper, the processing from step S107 to step S110 is repeated for the control such that the exposure becomes proper.

(Step S111) The shooting condition setting part 153 (the WB calculation part 153*b*) of the camera control part 109 determines the white balance gain for the live view image in the AWB (white balance computation). Here, as described previously, when the actual shooting image is shot with the flash, the WB calculation part 153*b* shoots the live view image in the AWB2 whereas, when the actual shooting image is not shot with the flash, the WB calculation part 153*b* shoots the live view image in the AWB1.

(Step S112) The shooting condition control part 154 (the WB control part 154*b*) of the camera control part 109 performs the white balance adjustment on the live view image captured in the image buffer 107. Here, the white balance adjustment is processing in which each of the R component and the B component of image data is multiplied by the white balance gain (gain R and gain B) determined in step S111. Therefore, the live view image captured in the image buffer 107 is subjected to the white balance adjustment, and is then displayed by the camera control part 109 on the display part 111.

As described above, the processing from step S107 to step S112 is repeated while the live view image is being displayed on the display part 111, and the live view image on which the white balance adjustment has been so performed as to have the hue similar to that of the actual shooting image is displayed on the display part 111. A series of processing steps is repeated until the shutter button 303 is pressed down in the subsequent step S113.

(Step S113) The camera control part 109 determines whether or not the shutter button 303 of the operation part 113 is pressed down. If the shutter button 303 is pressed down, the process moves to step S114 whereas, if the shutter button 303 is not pressed down, the process returns to step S107.

(Step S114) The camera control part 109 performs the actual shooting under the preset shooting conditions (the exposure condition and the white balance gain). Here, as the preset shooting conditions, the exposure condition of the actual shooting image determined in step S106 and the white balance gain are used; when the setting is the AWB, the white balance gain determined in step S106 from the temporal shooting image is used.

In this way, the image shooting device 101 of the present embodiment can individually select the shooting conditions (the exposure condition and the white balance gain) when the live view image is displayed on the display part 111 and the shooting conditions (the exposure condition and the white balance gain) when the actual shooting image is shot, and can be shot under the exposure condition and the white balance gain suitable for each image. Since, in particular, the image shooting device 101 of the present embodiment selects the white balance gain of the live view image according to whether the actual shooting image is shot with the flash or it is shot without the flash, an image whose finished quality is the same as the actual shooting image can be displayed as the live view image on the display part 111. Therefore, the photographer looks at the live view image displayed on the display part 111, and thus can recognize not only the focus and the composition but also the finished quality of the actual shooting image, with the result that convenience is enhanced.

Meanwhile, although, in the above embodiment, when the white balance mode is the AWB, the white balance gain is determined by extracting an achromatic part of the shooting image, if it is recognized that the flash is present in the temporal light emission, whether or not a color similar to the color of light emitted from an XE-tube (Xenon tube) is present in the temporal shooting image is determined, and the white balance gain may be set. In this case, if the region of the color similar to the color of the light emitted from the XE tube is present in the temporal shooting image, the WB calculation part 153*b* of the shooting condition setting part 153 determines the white balance gain such that the white balance for the color of the region is appropriate. By contrast, if the region of the color similar to the color of the light emitted from the XE tube is not present in the temporal shooting image, the white balance gain is set according to the preset color of light emitted from the XE tube. In this way, it is possible to set the white balance gain that is most suitable for the color of the light emitted from the XE tube used as the light source of the flash.

Furthermore, although, in the above description, the white balance gain for the actual shooting image is set in the NWB or the PWB, and the white balance gain for the live view image is set in the AWB, the user may set the white balance gain for the live view image in the MWB or the PWB and may set the white balance gain for the actual shooting image in the AWB.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image shooting device comprising:
    an image shooting part that shoots a subject;
    an operation part that provides an image shooting instruction to the image shooting part;
    a display part that displays a first image which is being shot by the image shooting part under a first light source on a display medium;
    a recording part that records a second image shot under a second light source by the image shooting part which receives the image shooting instruction from the operation part in a storage medium;
    a shooting condition setting part that sets a first shooting condition for the first image and a second shooting condition for the second image when the first light source is different from the second light source;
    a shooting condition control part that performs control on shooting conditions of the image shooting part such that the first image is shot under the first shooting condition set by the shooting condition setting part and the second image is shot under the second shooting condition set by the shooting condition setting part; and
    a flash light device recognition part that recognizes, by acquisition of information on the flash light device or by a test flash emitted from the flash light device, whether or not a flash device is attached, when the second light source is the flash light device which emits a flash at a time of shooting of the second image, wherein
    the shooting condition setting part sets the first shooting condition and the second shooting condition based on the information acquired from the flash light device when the flash light device recognition part recognizes an attachment of the flash light device.

2. The image shooting device according to claim 1, wherein
the first image is a live view image which is displayed on the display medium for checking the subject, and the second image is an actual shooting still image which is recorded in the storage medium.

3. The image shooting device according to claim 1, wherein
the first shooting condition and the second shooting condition are an exposure condition and a white balance gain.

4. The image shooting device according to claim 1, wherein
the shooting condition setting part sets any one of the first shooting condition and the second shooting condition to a white balance gain in a preset white balance mode or in a manual white balance mode, and sets the other of the first shooting condition and the second shooting condition to the white balance gain in an auto white balance mode, when the flash light device recognition part recognizes the attachment of the flash light device.

5. The image shooting device according to claim 4, wherein
two modes that are a first auto white balance mode in which proper white balance adjustment is performed and a second auto white balance mode in which adjustment for a specific light source is not performed are set when the auto white balance mode in which the white balance gain is automatically determined from a shooting image is used, and
the shooting condition setting part sets the white balance gain in the first auto white balance mode when the flash light device recognition part recognizes the attachment of the flash light device, whereas the shooting condition setting part sets the white balance gain in the second auto white balance mode when flash light device recognition part does not recognize the attachment of the flash light device.

6. The image shooting device according to claim 4, wherein
the shooting condition setting part determines whether or not a color similar to a luminescent color of the flash light device is present in the temporal shooting image when the white balance gain is set in the auto white balance mode, and
the shooting condition setting part sets the white balance gain for the color when the similar color is present, whereas the shooting condition setting part sets a preset white balance gain for the luminescent color of the flash light device when the similar color is not present.

7. An image shooting device comprising:
an image shooting part that shoots a subject;
an operation part that provides an image shooting instruction to the image shooting part;
a display part that displays a first image which is being shot by the image shooting part under a first light source on a display medium;
a recording part that records a second image shot under a second light source by the image shooting part which receives the image shooting instruction from the operation part in a storage medium;
a shooting condition setting part that sets a first shooting condition for the first image and a second shooting condition for the second image when the first light source is different from the second light source;
a shooting condition control part that performs control on shooting conditions of the image shooting part such that the first image is shot under the first shooting condition set by the shooting condition setting part and the second image is shot under the second shooting condition set by the shooting condition setting part; and
a flash light device recognition part that recognizes, by acquisition of information on the flash light device or by a test flash emitted from the flash light device, whether or not a flash device is attached, when the second light source is the flash light device which emits a flash at a time of shooting of the second image, wherein
the shooting condition control part sets the first shooting condition and the second shooting condition based on a temporal shooting image shot by the image shooting part through the test flash when presence of the flash light device recognition part recognizes an attachment of the flash light device.

8. The image shooting device according to claim 7, wherein
the first image is a live view image which is displayed on the display medium for checking the subject, and the second image is an actual shooting still image which is recorded in the storage medium.

9. The image shooting device according to claim 7, wherein
the first shooting condition and the second shooting condition are an exposure condition and a white balance gain.

10. The image shooting device according to claim 7, wherein
the shooting condition setting part sets a shooting condition of a lower sensitivity than the first shooting condition when the temporal shooting image is shot.

11. The image shooting device according to claim 7, further comprising:
a decreasing amount setting part that sets the shooting condition for the temporal shooting image by an amount of decrease with respect to the first shooting condition, wherein
the shooting condition control part shoots the temporal shooting image in accordance with the amount of decrease set by the decreasing amount setting part when the temporal shooting image is shot.

12. The image shooting device according to claim 7, wherein
the shooting condition setting part sets any one of the first shooting condition and the second shooting condition to a white balance gain in a preset white balance mode or in a manual white balance mode, and sets an other of the first shooting condition and the second shooting condition to the white balance gain in an auto white balance mode, when the flash light device recognition part recognizes the attachment of the flash light device.

13. The image shooting device according to claim 12, wherein
two modes that are a first auto white balance mode in which proper white balance adjustment is performed and a second auto white balance mode in which adjustment for a specific light source is not performed are set when the auto white balance mode in which the white balance gain is automatically determined from a shooting image is used, and
the shooting condition setting part sets the white balance gain in the first auto white balance mode when the flash light device recognition part recognizes the attachment of the flash light device, whereas the shooting condition setting part sets the white balance gain in the second auto white balance mode when flash light device recognition part does not recognize the attachment of the flash light device.

14. The image shooting device according to claim 12, wherein the shooting condition setting part determines whether or not a color similar to a luminescent color of the flash light device is present in the temporal shooting image when the white balance gain is set in the auto white balance mode, and the shooting condition setting part sets the white balance gain for the color when the similar color is present, whereas the shooting condition setting part sets a preset white balance gain for the luminescent color of the flash light device when the similar color is not present.

* * * * *